April 21, 1942.  H. J. WHITE  2,280,330
POWER CIRCUIT FOR ELECTRICAL PRECIPITATORS
Filed Aug. 22, 1940
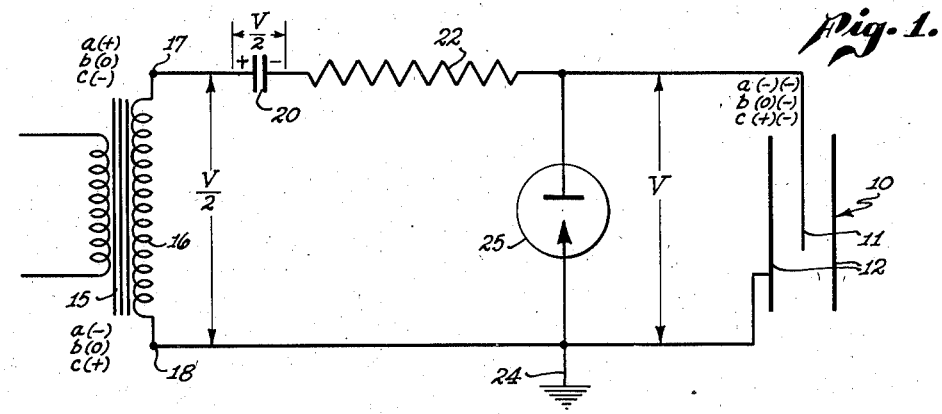
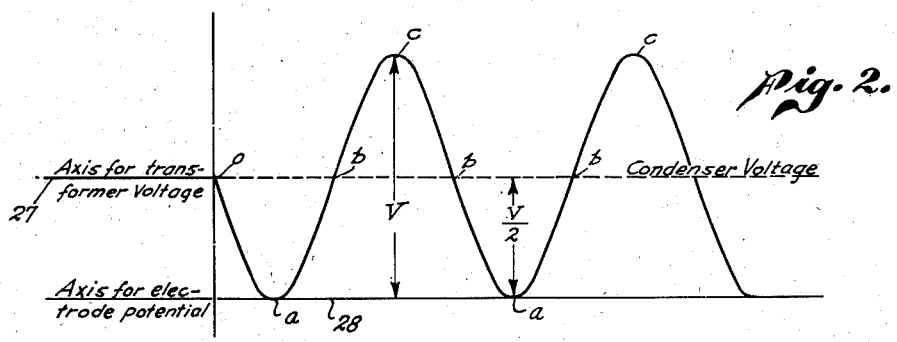
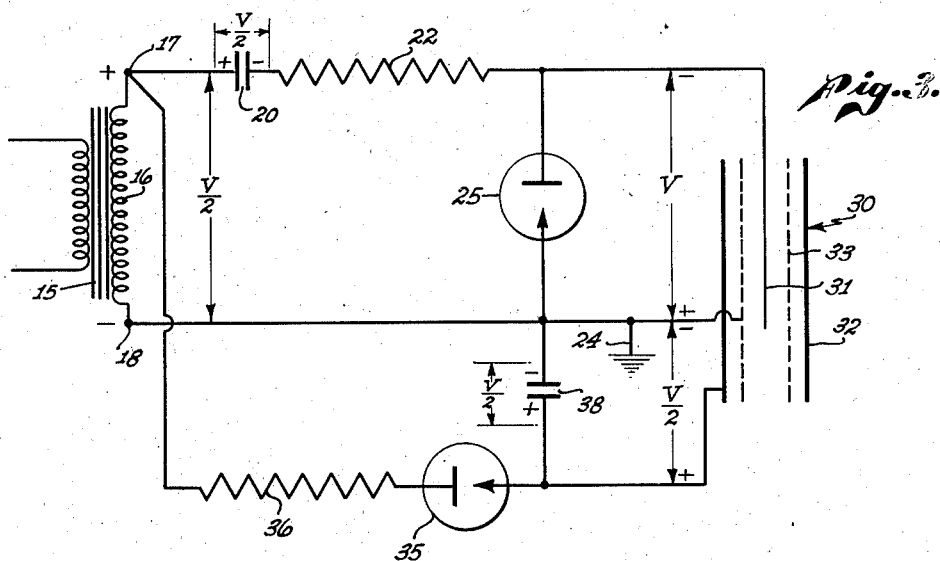
INVENTOR.
HARRY J. WHITE,
BY
ATTORNEY.

Patented Apr. 21, 1942

2,280,330

UNITED STATES PATENT OFFICE 2,280,330

POWER CIRCUIT FOR ELECTRICAL PRECIPITATORS

Harry J. White, Los Angeles, Calif., assignor to Research Corporation, New York, N. Y., a corporation of New York Application August 22, 1940, Serial No. 353,781

6 Claims. (Cl. 183—7)

The present invention relates generally to the art of electrical precipitation of dust particles from a gas in which the particles are suspended, and more especially to electrical circuits for supplying power to the precipitation apparatus.

For an electrical precipitator, electric current is supplied at high voltages that ordinarily range from 5,000–50,000 volts, and in some cases even higher. In order to obtain the required high voltage, it is customary to use alternating current at low potential and raise the voltage by means of a transformer, as this is simpler and more economical than generation of alternating current at high potential. The alternating current at high potential is then rectified by suitable means, such as a rotary synchronous rectifier or a rectifying vacuum tube, preferably in a manner to secure a full wave rectification. In this manner, uni-directional current is supplied to the electrodes of the precipitator.

Vacuum tube rectifiers are used where possible, but many technical difficulties are encountered because of the high voltages necessary. The equipment used must have high voltage ratings, in some cases two or more times the actual voltage applied to the electrodes, and this not only makes the equipment relatively costly but also places a limit on the operating voltages possible at the precipitator electrodes.

It is thus a general object of my invention to provide a power supply circuit for a precipitator in which the required voltage rating for vacuum tubes, transformer, and other pieces of equipment is lower than in conventional circuits, thus contributing to long life and economy of operation.

Another object is to provide such a circuit in which the initial cost of the various items of electrical equipment can be substantially reduced for a given voltage applied to the precipitator electrodes, as compared with conventional practice.

It is also an object to provide a power circuit for energizing the precipitator electrodes that supplies thereto a current having the characteristics of fully rectified current in order to increase the precipitator effectiveness.

These objects are accomplished according to my invention by providing a source of alternating current at high potential, preferably a transformer with two terminals on the secondary coil, a condenser, and a half-wave rectifier, preferably an electron tube. The electrodes of the precipitator are connected one to each terminal of the current source, with the condenser in series with one electrode and the half-wave rectifier connected in parallel across the two electrodes at a point where the condenser in one electrode lead is between the current source and the rectifier. The operation of the circuit is improved by placing a resistor in series with the condenser and its associated electrode.

This circuit is suited to precipitators having one or more pairs of electrodes, and it may be added to in order to energize a precipitator having one or more three-electrode systems. In the latter case, there is added to the above circuit a second half-wave rectifier connected in series with the third electrode and the first terminal of the current source to which the condenser is connected. A resistor is preferably placed in series with the second rectifier.

How the above objects and advantages of my invention, as well as others not specifically mentioned, are attained will be better understood by reference to the following description and the annexed drawing, in which:

Fig. 1 is a wiring diagram showing my improved power supply circuit;

Fig. 2 is a voltage-time curve showing the potential difference between the precipitator electrodes of Fig. 1;

Fig. 3 is a wiring diagram showing a variational form of circuit for a three-electrode system.

There is shown diagrammatically in Fig. 1 a precipitator 10 comprising a discharge electrode 11 and an opposing collecting electrode 12. The precipitator may have more than one pair of electrodes, and may be of the single field or separated field type.

The power supply circuit for energizing electrodes 11 and 12 includes any suitable source of alternating current at a relatively high potential, and is preferably, as shown, transformer 15 having a secondary coil 16 provided with two terminals 17 and 18. The transformer receives alternating current and raises it to the desired high potential which is available across terminals 17 and 18. The circuit also includes condenser 20 and resistor 22 which are in series with each other and with discharge electrode 11 which is connected to terminal 17. Collecting electrode 12 is connected to the other transformer terminal 18 and is also grounded, as at 24.

A half-wave rectifying electron tube 25 is connected to the leads to the electrodes in such a way as to be in parallel across electrodes 11 and 12. Condenser 20 and resistor 22 are placed between rectifier 25 and current source 15. Resistor 22 is not necessary in all cases and may be omitted if desired, its purpose being to damp out transients in the circuit.

Operation of the circuit may be better understood by reference to the voltage curve of Fig. 2. The same curve may be used, by shifting the X-axis, to represent both the transformer secondary voltage and the potential applied to electrode 11. When referred to the horizontal line 27 as the X-axis, the curve represents the transformer voltage; when referred to line 28 as the X-axis, the curve represents the potential on the discharge electrode. The dotted line "condenser voltage" is also referred to line 28.

Starting to follow along the voltage curve beginning at 0, the entire system may be assumed to be discharged or neutral at this point since the transformer voltage is zero. At the point $a$ on the curve, terminal 17 is positive (+) and terminal 18 is negative (—), and the potential across the terminals is V/2 when V is the potential across electrodes 11 and 12. Assuming condenser 20 to be fully discharged initially, one side of condenser 20 now becomes positive. Current flows to the other side of the condenser from terminal 18 through half-wave rectifier 25 from the filament to the plate, and the other side of condenser 20 becomes negative, the potential across the condenser also being V/2. Both electrodes 11 and 12 may be considered as being negative with respect to the circuit. Actually electrode 11 is at a slight positive potential with respect to electrode 12 equal to and because of the voltage drop across tube 25; but practically this difference may be neglected and the electrodes considered to be at the same potential because the tube voltage drop is relatively small, being less than 1000 volts or about .02 V. Electrode 12 remains at ground potential because it is grounded at 24, though it changes with respect to the rest of the system.

As the voltage rises along the curve from $a$ to $b$, the potential across terminals 17 and 18 decreases to zero, and both terminals are at zero potential at $b$. The potential of V/2 across the condenser remains substantially unchanged (at least ideally) and, since there is no reverse current flow through the rectifier, discharge electrode 11 is placed by the condenser at a —V/2 with respect to electrode 12, which is still zero.

During further change of the voltage along the curve to $c$, the potential across terminals again becomes V/2, but in a reverse direction, as terminal 17 is negative and terminal 18 is positive. This potential of V/2 across the transformer secondary adds to the potential of V/2 across the condenser, and the total potential of V/2+ V/2 or V is impressed across electrodes 11 and 12.

During the second half of the voltage cycle, the process is reversed, and conditions at $b$ and $a$, as above described, again obtain. The condenser voltage is assumed to remain constant at V/2; though in practice it varies slightly because the condenser discharges slightly during the half cycle $b$—$c$—$b$. Of course the capacity of the condenser is such as to keep the potential within desired limits in spite of discharge.

Assuming the ideal condition that condenser 20 stays charged at a constant potential as indicated in Fig. 2 by the horizontal dotted line, the circuit operation may be described briefly as one of alternately adding to and subtracting from it an equal potential, and applying to electrodes 11 and 12 the resultant potential, which varies from zero to V.

In the case of a precipitator having one or more systems of three electrodes each, the above circuit may be modified by adding thereto elements suited to energize the third electrode. Fig. 3 illustrates diagrammatically a precipitator 30 having discharge electrode 31, collecting electrode 32, and intermediate electrode 33 which is fluid pervious and is maintained at a potential difference with respect to both other electrodes. Discharge electrode 31 is connected as before to terminal 17 with condenser 20 and resistor 22 in series; intermediate electrode 33 is connected to the other terminal 18, in place of collecting electrode 12; and the basic circuit operates as previously described to energize these two electrodes and maintain them at a potential difference V, the intermediate electrode being at ground potential.

A second half-wave rectifier 35, preferably an electron tube, and a second resistor 36, are connected to the first terminal 17 in series with each other and with collecting electrode 32. A second condenser 38 is connected in parallel across electrodes 32 and 33 between rectifier 35 and the precipitator. These additions to the circuit operate to maintain a potential difference of V/2 between the intermediate and collecting electrodes, as will now be explained.

During the half-cycle $b$—$a$—$b$ on the curve of Fig. 1, terminal 17 is positive and the potential difference between terminals 17 and 18 is V/2. The plate of rectifying tube 35 is positive and the electron flow thereto from the filament charges condenser 38 to a potential of V/2, the transformer voltage, and likewise establishes a potential difference of V/2 between electrodes 32 and 33. During the other half-cycle, there is no current flow through rectifier 35 and condenser 38 maintains the potential between the electrodes substantially constant. Though in practice the condenser discharges somewhat and the voltage drops correspondingly, this effect can be minimized by proper selection of the condenser; and of course the condenser is fully recharged each half cycle.

It is customary practice for the discharge electrode to be negative, and the collecting electrode is then positive with respect thereto as shown in the drawing, though it is at zero potential in an absolute sense since it is at ground potential. The discharge electrode can be made positive by reversing the connections to rectifier 25.

In a three-electrode system, the collecting electrode is positive with respect to the intermediate electrode, which is grounded, when the discharge electrode is negative.

One of the greatest advantages of my improved power circuit is the reduction of the rated voltage of the equipment to one-half that required in conventional circuits in which the rectifier tube is in series with the electrodes. In such conventional circuits energizing the electrodes to a potential difference of V, the transformer rating must be V and the rectifying tube rating 2V, whereas in the above described circuit the transformer rating is only V/2 and the tube rating V for the same electrode potential. This fact makes the cost of the component parts of the circuit much less, increases the life of the parts, decreases operating costs, and makes possible the use of tube rectifiers in many instances where it was not formerly practical.

My improved circuit is also less subject to trouble since a spark-over from the discharge to the collecting electrode does not harm the rectifier. The sparkover acts to short out the tube from the circuit, thus preventing harm to it from overload surges caused by the spark. In conventional circuits, the tube receives such surges, and protective equipment is required to prevent burning out the tube in the event of sparkover.

Another advantage of the circuit is that the filament of rectifier 25 is at ground potential instead of at a high potential with respect thereto. This condition eliminates the necessity of insulating the filament transformer and makes the problem of mounting it much simpler and cheaper.

A further important advantage is that by using a half-wave rectifying tube, current is received from the transformer on both half-waves of the secondary voltage, compared with alternate half-waves in a standard circuit. This fact improves the effectiveness of the precipitator. With the voltage curve of Fig. 1 applied to the electrodes, the average voltage between electrodes is V/2 or .5 V. When the voltage is a conventional half-wave of amplitude V, the average voltage is V/π or .32 V. Hence my novel circuit increases the average voltage about 50% over conventional circuits.

From the foregoing description it will be seen that various changes in or additions to the power supply circuit of my invention may be made without departing from the spirit or scope of my invention; and consequently it is to be understood that the above description is to be construed as illustrative of rather than limitative upon the invention set out in the appended claims.

I claim:

1. In combination with electrical precipitation apparatus for cleaning gases and comprising a pair of complementary electrodes, an electric circuit for energizing said electrodes comprising a source of alternating current at a relatively high potential, said source having two terminals; a condenser; one of the electrodes being connected to one of the terminals in series with the condenser; the other electrode being connected to the other of the terminals; and a half-wave rectifier connected in parallel across the pair of electrodes, with the condenser between the current source and the rectifier.

2. In combination with electrical precipitation apparatus for cleaning gases and comprising a pair of complementary electrodes, an electric circuit for energizing said electrodes comprising a source of alternating current at a relatively high potential, said source having two terminals; a condenser; a resistor; one of the electrodes being connected to one of the terminals in series with the condenser and resistor; the other electrode being connected to the other of the terminals; and a half-wave rectifier connected in parallel across the pair of electrodes, with the condenser and resistor between the current source and the rectifier.

3. In combination with electrical precipitation apparatus for cleaning gases and comprising a pair of complementary electrodes, an electric circuit for energizing said electrodes comprising a transformer having primary and secondary coils, the primary coil being connected to a source of alternating current and the secondary coil supplying alternating current at a relatively high potential; a condenser; one of said electrodes being connected to one side of the secondary coil in series with the condenser and the other connected to the other side of the secondary coil; and a half-wave rectifier connected in parallel across the two electrodes with the condenser between the transformer and the rectifier.

4. In combination with electrical precipitation apparatus for cleaning gases and comprising a pair of complementary electrodes, an electric circuit for energizing said electrodes comprising a transformer having primary and secondary coils, the primary coil being connected to a source of alternating current and the secondary coil supplying alternating current at a relatively high potential; a condenser; one of said electrodes being connected to one side of the secondary coil in series with the condenser and the other connected to the other side of the secondary coil; and a half-wave rectifying electron tube connected in parallel across the two electrodes with the condenser between the transformer and the rectifier.

5. In combination with electrical precipitation apparatus for cleaning gases and comprising a discharge electrode and a grounded opposing electrode, an electric circuit for energizing said electrodes comprising a transformer having primary and secondary coils, the primary coil being connected to a source of alternating current and the secondary coil supplying alternating current at a relatively high potential; a condenser; a resistor; the discharge electrode being connected to one side of the secondary coil in series with the condenser and resistor, and the grounded electrode being connected to the other side of the secondary coil; and a half-wave rectifying electron tube connected in parallel across the electrodes with the plate connected to the discharge electrode and the filament grounded, the condenser and resistor being between the transformer and the rectifying tube.

6. In combination with electrical precipitation apparatus for cleaning gases and having a system of electrodes that includes a discharge electrode, a collecting electrode, and an intermediate electrode, an electrical circuit for energizing said electrodes comprising a source of alternating current at a relatively high potential, said source having two terminals; a condenser; the discharge electrode being connected to one of the terminals in series with the condenser, and the intermediate electrode being connected to the other of the terminals; a half-wave rectifier connected in parallel across the discharge and intermediate electrodes with the condenser between the current source and the rectifier; a second half-wave rectifier connected in series with the collecting electrode to the first mentioned terminal of the current source; and a second condenser connected in parallel across the collecting and intermediate electrodes.

HARRY J. WHITE.